United States Patent [19]

Dehar

[11] E Re. 28,844

[45] Reissued June 8, 1976

[54] VALVE ASSEMBLY

[75] Inventor: David C. Dehar, Dearborn Heights, Mich.

[73] Assignee: Ford Motor Company, Dearborn, Mich.

[22] Filed: Feb. 14, 1975

[21] Appl. No.: 550,241

Related U.S. Patent Documents

Reissue of:

[64] Patent No.: 3,811,650
Issued: May 21, 1974
Appl. No.: 347,964
Filed: Apr. 4, 1973

[52] U.S. Cl. ..... 251/144; 251/217; 184/1.5

[51] Int. Cl.[2] ..... B65D 41/04

[58] Field of Search ..... 251/144, 217; 137/351; 184/1.5; 285/194, 162; 85/DIG. 2, 32 K, 32.1; 220/288; 248/27

[56] References Cited

UNITED STATES PATENTS

| | | | |
|---|---|---|---|
| 2,474,430 | 6/1949 | Lave | 251/217 |
| 2,552,782 | 5/1951 | Hall et al. | 85/32 K X |
| 2,636,514 | 4/1953 | Woodward | 251/217 X |
| 2,684,176 | 7/1954 | Lehr | 220/326 |
| 2,800,245 | 7/1957 | Doyle et al. | 220/373 |
| 3,468,565 | 9/1969 | Roder | 285/194 |
| 3,470,893 | 10/1969 | Nelson | 137/351 X |
| 3,574,899 | 4/1971 | Fisher | 248/27 |
| 3,631,738 | 1/1972 | Harper | 285/DIG. 2 X |
| 3,643,917 | 2/1972 | Griffiths et al. | 251/215 |
| 3,754,677 | 8/1973 | Hug | 184/1.5 X |

FOREIGN PATENTS OR APPLICATIONS

| | | | |
|---|---|---|---|
| 1,253,868 | 1/1961 | France | 220/38.5 |

*Primary Examiner*—William R. Cline
*Attorney, Agent, or Firm*—John J. Roethel; Keith L. Zerschling

[57] ABSTRACT

A valve assembly suitable for use as a draincock in an automobile radiator. The valve elements can be preassembled and installed in a stamped opening in a radiator tank by simple snap-in action. The assembly includes three elements: (1) an insert, (2) a threaded plug, and (3) a gasket that forms a seal between the plug and wall of the radiator tank.

12 Claims, 8 Drawing Figures

VALVE ASSEMBLY

Matter enclosed in heavy brackets [ ] appears in the original patent but forms no part of this reissue specification; matter printed in italics indicates the additions made by reissue.

BACKGROUND AND SUMMARY OF THE INVENTION

A typical radiator used in an automotive vehicle as a heat exchanger for the engine coolant is provided with a draincock or valve at its base to facilitate the removal of coolant from the engine. A commonly used drain valve is a brass assembly having a fitting soldered to the lower portion of the radiator tank threadedly receiving a valve or cock assembly. The valve assembly generally includes two or more threaded members, a pair of sealing surfaces and a knob. In addition to the need to solder the insert to the radiator tank, the threaded surfaces of the fitting and the valve elements must be formed by a screw machine. Furthermore, the valve assembly must be threaded into the insert and torqued to a predetermined magnitude during manufacture of the radiator assembly.

This invention provides a valve assembly which can be preassembled and simply pushed into a stamped hole or opening formed in a container such as a radiator tank. The invention also provides a valve assembly which can be molded from a low cost plastic material and which requires no machining processes in manufacture. The invention further provides a valve assembly not subject to metallic corrosion and not reliant on metal-to-metal sealing. Finally, the invention provides a valve construction which is economical to produce, reliable in operation and readily adaptable for use in a conventional automobile radiator.

A valve assembly constructed in accordance with this invention includes: (1) an insert received within an opening formed in a wall of a container or tank, (2) a plug member received within the insert member, and (3) a seal or gasket. The insert includes a portion having a cross sectional shape that cooperates with the shape of the opening in the tank to prevent rotation of the insert relative to the tank and threaded portion having an axis extending generally perpendicular to the wall of the tank. The plug member includes a stem portion threadedly received within the insert member and a head portion which compresses the gasket against the tank wall.

DETAILED DESCRIPTION OF THE PREFERRED EMBODIMENT

Figure 1:
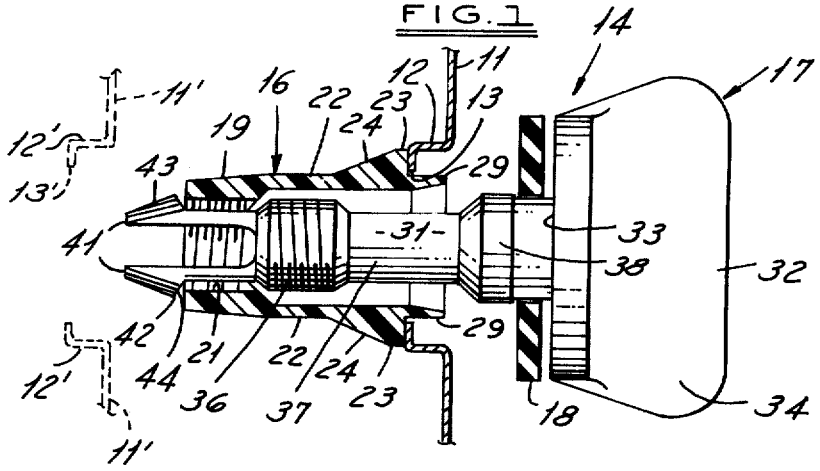
FIG. 1 of the drawings illustrates a preferred embodiment of the valve assembly in an open condition. The dotted line representation illustrates the relationship of the valve assembly and the tank wall opening just prior to insertion of valve assembly. The solid line representation of the tank wall opening represents the relationship of the valve assembly when fully received within the opening.

Numeral 11 represents a portion of a radiator or other container wall having a reinforcing boss 12 and an opening 13 formed therein. A valve assembly 15, received within the opening 13, consists of an insert member 16, a plug member 17 and a gasket or seal 18.

The insert member 16 has a generally square-shaped cross section which fits into the correspondingly shaped opening 13 in the wall 12. The square shape prevents rotation of the insert member relative to the opening. The inner end of the insert is a collar or nut 19 having a threaded bore 21 formed therein with an axis generally perpendicular to a plane of the wall portion 11. Integrally formed with the collar are a pair of cantilevered axially extending fingers 22. Near the free end of each of the fingers is an abutment 23 having a ramp surface 24 to aid the installation of the insert member into the opening 13. Extending past the abutments 23 and into the opening 13 are ends 29, which are accessible from the outer side of wall 11 to facilitate removal of the valve assembly from the opening 13. Positioned peripherally between the fingers 22 are a pair of cantilevered axially extending members 26 including a second pair of abutments 27. The abutments 27 of members 26 engage the outer surface of wall portion 11 adjacent the opening 13 when the insert is fully received within the opening, while the abutments 23 of fingers 22 engage the inner surface of the wall adjacent the opening. Accordingly, the abutments 23 and 27 cooperate to define the installed position of insert member 16 and to prevent its unintended removal. Radially inward deformation of members 26 is prevented by the intermediate location of fingers 22. The members 26 also include openings 28 formed therein to increase fluid flow through the valve assembly 15.

Received within the insert member 16 is a plug member 17 which includes an axially extending stem portion 31 and a head portion 32. The head portion includes an inner surface 33 substantially parallel to the wall 11 and a knob 34 that may be grasped between a thumb and forefinger to facilitate turning the plug member relative to the insert.

Figure 2:
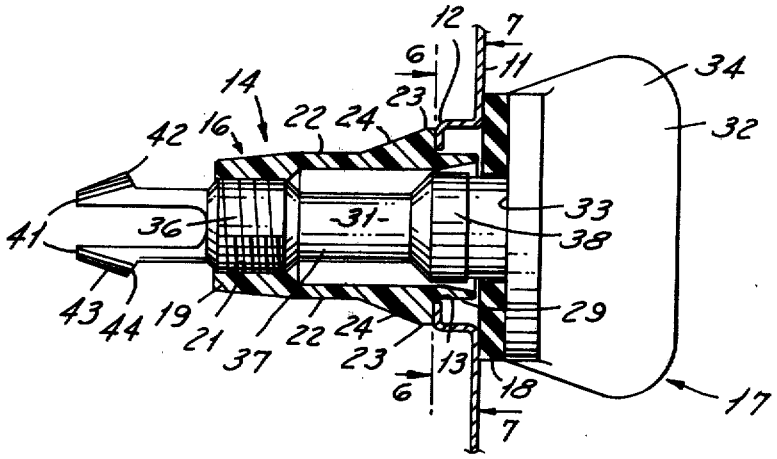
FIG. 2 is a partial cross sectional view of the valve assembly received within an opening of a container wall similar to FIG. 1 but in a closed condition.

The stem 31 includes a threaded portion 36 engageable with the threads 21 of the collar 19 of the insert member 16 as shown in FIG. 2 of the drawings. When the threads are fully received within the collar, the surface 33 of the head compresses the gasket 18 against the wall portion 11 to form a liquid seal. Between the threaded portion 36 of the stem and the head 32 is a reduced diameter section 37 and a shoulder or enlarged diameter portion 38 of the stem which when the valve assembly is closed, as shown in FIG. 2, is received within or between the fingers 22. The fingers 22 are thus prevented from bending inwardly and releasing the insert member from opening 13. A small annular recess 39 may be formed in the shoulder 38 to act as a retainer for the gasket 18.

Extending from the inner end of the threaded portion 16 of the stem 31 is a pair of cantilevered fingers 41 with double ramp abutments 42 which act as retaining means to prevent the unintended withdrawal or expulsion of the plug 17 from the insert 16 when the valve assembly is in a fully opened condition, as shown in FIG. 1. The dimension from abutment to abutment of fingers 41 is slightly greater than the minimum diameter of threaded bore 21. The lesser inclined ramp side 43 aids the insertion of the plug into the threaded portion of the insert member and the greater inclined ramp side 44 aids the intentional withdrawal of the plug member 17 from the insert 16.

The gasket 18 is a rubber or rubber-like disc or washer of a material unaffected by the solution contained within the tank.

Figure 3:
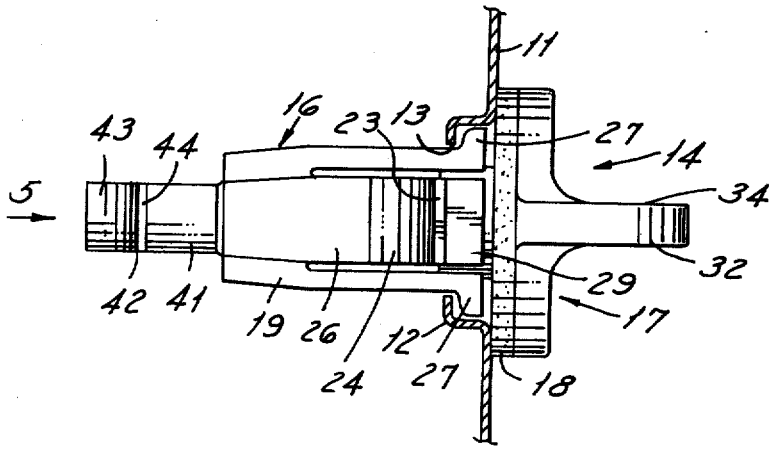
FIG. 3 is a side elevational view of the valve assembly rotated 90° to that illustrated by FIG. 2.

To preassemble the valve assembly, the gasket 18 is positioned about the shoulder portion 38 of the plug member 17 and the free end of the stem 31 is inserted into the insert 16 until the abutment means 24 of the fingers 41 pass through the threaded collar 19 and are positioned as shown in FIG. 1 of the drawings. The valve assembly in this preassembled state is then positioned in front of the opening 13' in the radiator tank wall 11' represented by the broken lines of FIG. 1. The valve assembly 14 is next pushed into the hole 13 until the opening and the insert member in an open condition is positioned within the opening 13 as shown by solid line representation in FIG. 1. When the abutments 27 of members 26 engage the outer surface of wall 11 the valve assembly is fully received within opening 13. The valve assembly may then be closed by hand or by a tool so that the relationship of the valve elements is as shown in FIGS. 2 and 3. In the closed position, the shoulder portion 38 of the plug member 17 extends into the insert member 16 and precludes inward deformation of the fingers 22 preventing removal of the valve assembly.

The valve assembly 14 can be removed from the opening 13 when it is in an open condition as shown in FIG. 1 by the radially inward depression or deformation of the fingers 22. In the event that the container is closed as is a radiator tank, access to the fingers must be gained from outside the tank. In that event, a tweezer-like tool (not shown) can be used to pinch together the ends 29 causing fingers 22 to be deformed sufficiently to permit passage of abutments 23 through the opening 13 and the withdrawal of the insert member 16 from the opening.

Liquid from within the tank is permitted to drain when the valve assembly 14 is in an open condition as shown in FIG. 1. Fluid passes through the openings 28 as well as through the threaded bore 21 and past the reduced diameter portion 37 and the shoulder portion 38 of the plug member 17. When the plug member is tightened the gasket 18 and the wall portion 11 are compressed between the inner surface 33 of the plug member and the abutments 23 of the insert member causing the gasket to seal against the outer surface of the wall and inner surface of the plug.

Figure 8:
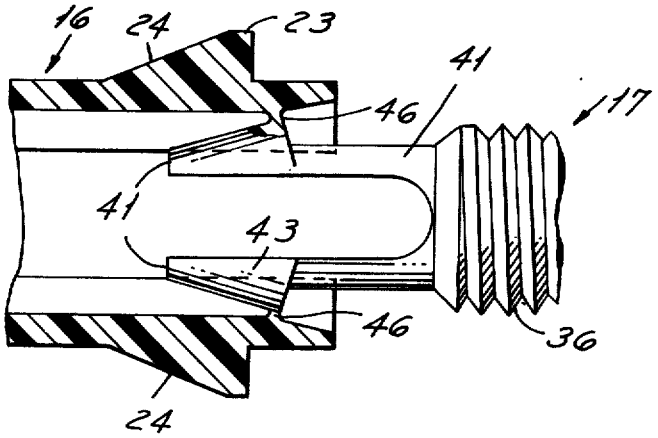
FIG. 8 is a partial cross sectional and elevational view of an alternate embodiment of the invention in which the insert member and the plug member are cast as an integral unit.
Figure 5:
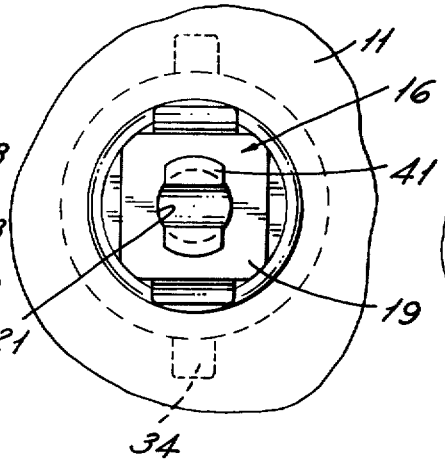
FIG. 5 is an end elevational view of an installed plug assembly viewed in the direction of the arrow of FIG. 3.
Figure 6:
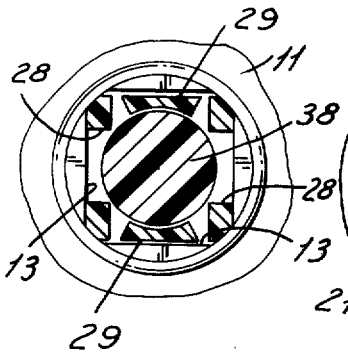
FIG. 6 is a cross sectional view taken along line 6—6 of FIG. 2.
Figure 7:
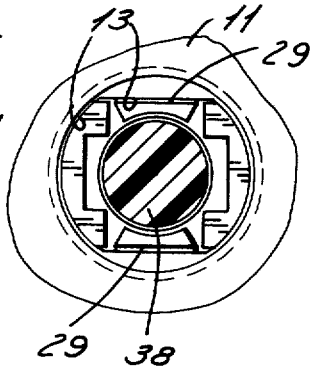
FIG. 7 is a cross sectional view taken along line 7—7 of FIG. 2.
Figure 4:
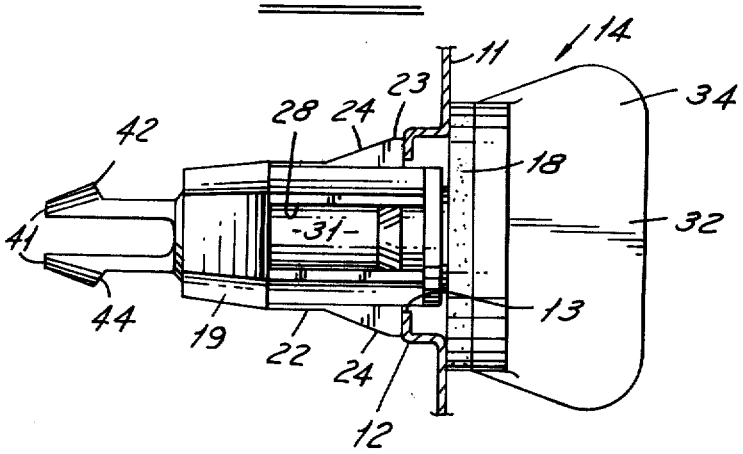
FIG. 4 is a side elevational view of an installed valve assembly axially rotated 90° from the position shown in FIG. 3 and corresponding to the position shown in FIG. 2.

The insert member 16 and plug member 17 are preferably individually injection molded of a suitable plastic material. When so molded the parts require no machining. An alternate embodiment of the invention is shown in FIG. 8 in which the insert member and the plug member are molded as a unit. With the embodiment of FIG. 8, gasket 18 must be placed over the insert member portion 16 and about the shoulder portion 38 as a preassembly operation. The integrally formed insert and plug member with the gasket in position is then inserted within the opening 13 of the radiator tank. As the installer imparts an axial force to the assembly, the connections 46 sever and the plug 17 bears against the outer end of the threaded bore 21 of the insert member. With additional axial force, the insert is pushed into the opening 13 until the abutments 27 engage the front side of the opening and the abutments 23 have snapped into place at the back side of the opening.

Modifications and alterations will occur to those skilled in the art which are included within the scope of the following claims.

I claim:

1. A valve assembly for a liquid container comprising:

an insert member received within an opening formed in a wall of the container and a plug member received within said insert member and seal means positioned between a portion of said plug member and a portion of the wall about said opening, said insert member including a portion having a cross sectional shape which cooperates with the shape of said opening to prevent rotation of said insert relative to said opening, a threaded portion having an axis extending generally perpendicular to said wall portion, first abutment means engageable with the inner surfaces of said wall adjacent said opening, said plug member including a stem portion received within said insert member and having a threaded portion engageable with the threaded portion of said insert, a head portion of dimensions greater than said opening, said plug member being rotatable relative to said insert causing said threaded portions to displace said plug member axially relative to said insert member and to compress said seal means and said wall portion between said abutment means and said head portion.

2. A valve assembly according to claim 1, said plug member including retention means engageable with said insert member when the threaded portion of said plug member is completely withdrawn from the threaded portion of said insert member.

3. A valve assembly according to claim 2, said retention means comprising at least one cantilevered finger including an abutment engageable with said insert member when the threaded portion of said plug member is withdrawn from the threaded portion of said insert member.

4. A valve assembly according to claim 2, said retention means comprising a plurality of cantilevered fingers extending axially inwardly from the threaded portion of said plug member, said fingers including abutment means engageable with the end of the threaded portion of said insert member, said fingers being deformable to permit the passage of said fingers through the threaded portion of said insert member upon application of a predetermined axial withdrawal force to said plug member when the threaded portions of said plug member and insert member are disengaged.

5. A valve assembly according to claim 1, said insert member including second abutment means [ engageable with the outer surface of said wall adjacent said opening. ] *extending radially outwardly on the side of said wall opposite said first abutment means.*

6. A valve assembly according to claim 5, said insert member including at least one axially extending finger, said first abutment means positioned on said just-mentioned finger, said finger being deformable to permit passage of said first abutment means through said opening upon insertion of said insert assembly into said opening.

7. A valve assembly according to claim 5, said insert member including a pair of axially extending fingers, said first abutment means positioned on each of said fingers, said fingers being deformable in a radially inwardly direction to permit passage of said first abutment means through said opening upon insertion of said insert assembly into said opening.

8. A valve assembly according to claim 7, said first abutment means including ramp means causing said fingers to be radially inwardly deformed as the insert member is inserted into said opening.

9. A valve assembly according to claim 7, said stem portion of the plug member including a shoulder portion received within said fingers to preclude radially inward deformation of said fingers sufficient to permit the withdrawal of said insert member from said opening when the threaded portion of said plug member is received within the threaded portion of said insert member, said stem portion including a reduced diameter portion received within said fingers permitting radially inward deformation of said fingers sufficient to permit the insertion or withdrawal of the insert member into or from said opening when the threaded portion of said plug member is withdrawn from the threaded portion of the insert member.

10. A valve assembly according to claim 7, said fingers including end portions extending through said opening when said insert is fully received within said opening, said end portions being accessible from the outside of the container when the threaded portion of the plug member is withdrawn from the threaded portion of the insert member.

11. A valve assembly according to claim 5, openings formed in said insert member permitting the passage of liquid through said insert member and about said reduced diameter portion of said plug member when the threaded portion of said plug member is disengaged from the threaded portion of said insert means.

12. A valve assembly for a liquid container comprising an insert member received within an opening formed in a wall of the container and a plug member received within said insert member and seal means positioned between a portion of said plug member and a portion of the wall about said opening, said insert member including a portion having a cross sectional shape which cooperates with the shape of said opening to prevent rotation of said insert relative to said opening, a threaded portion having an axis extending generally perpendicular to said wall portion, a plurality of axially extending first fingers, first abutment means positioned on each of said fingers engageable with the inner surface of said wall adjacent said opening, said fingers being deformable in radially inwardly directions to permit passage of said first abutment means through said opening upon insertion of said insert assembly into said opening, second abutment means [ engageable with the outer surface of said wall adjacent said opening, ] *extending radially outwardly on the side of said wall opposite said first abutment means,* said plug member including a stem portion received within said insert member and having a threaded portion engageable with the threaded portion of said insert, a head portion of dimensions greater than said opening, retention means comprising a plurality of cantilevered second fingers extending axially inwardly from the threaded portion of said plug member, said second fingers including abutment means engageable with the end of the threaded portion of said insert member, said fingers being deformable to permit the passage of said fingers through the threaded portion of said insert member upon application of a predetermined axial withdrawal force to said plug member when the threaded portions of said plug member and said insert member are disengaged, said plug member being rotatable relative to said insert causing said threaded portions to displace said plug member axially relative to said insert member and to compress said seal means and said wall portion between said abutment means and said head portion.

* * * * *